July 20, 1926.
W. K. KEARSLEY, JR.
Re. 16,386
METHOD OF AND APPARATUS FOR AUTOMATICALLY REMOVING GASES
Original Filed Nov. 29, 1918
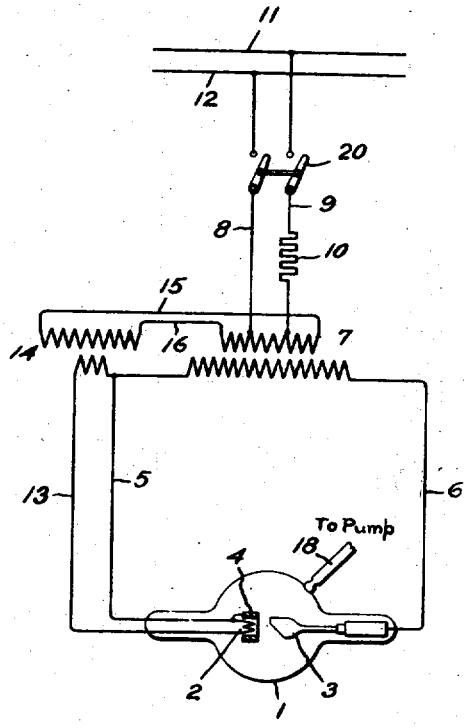
Inventor:
William K. Kearsley, Jr.
by Albert G. Davis
His Attorney.

Reissued July 20, 1926. Re. 16,386

UNITED STATES PATENT OFFICE.

WILLIAM K. KEARSLEY, JR., OF SCHENECTADY, NEW YORK, ASSIGNOR TO GENERAL ELECTRIC COMPANY, A CORPORATION OF NEW YORK.

METHOD OF AND APPARATUS FOR AUTOMATICALLY REMOVING GASES.

Original No. 1,357,710, dated November 2, 1920, Serial No. 264,695, filed November 29, 1918. Application for reissue filed September 11, 1922. Serial No. 587,586.

The present invention comprises a method and apparatus for treating electrical discharge devices such, for example, as X-ray tubes, in order to free the same from gases which would be disengaged during the operation of the device and become ionized, thereby interfering with the desired functioning of the device.

In the preparation of a device to be operated with a substantially pure electron discharge, it is necessary not only to remove gas from the space within said device but also from the metal parts, particularly the electrodes and from the walls of the globe. In accordance with my invention these gases are removed while the device is operated on the pump and the energy input is automatically regulated to prevent damage to the device. The novel features of my invention will be set forth with particularity in the appended claims.

The accompanying drawing illustrates diagrammatically an apparatus embodying my invention.

Referring to the drawing the device shown in connection with my invention is an X-ray tube comprising an envelop 1 containing a cathode 2 and an anode 3, the cathode being surrounded by a discharge control focusing member 4 which is electrically connected to the cathode, as shown. The cathode and anode are connected respectively by conductors 5 and 6 to the high potential secondary of a transformer 7. The primaries of the transformer are connected by conductors 8 and 9 in series with an ohmic resistance 10, to current supply mains 11 and 12. The cathode 2 of the X-ray tube is connected by conductors 5 and 13 to low voltage secondary of a small transformer 14 in order to furnish heating current for operating the cathode at incandescence. The primary of transformer 14 is connected by conductors 15 and 16 to the primary winding of the transformer 7, the voltage of the cathode heating current hence being proportional to the voltage of the main supply circuit, as modified by the voltage drop in the resistance device 10. In the particular apparatus illustrated the primary of the transformer 14 is connected to the outer terminals of turns of the primary winding of transformer 7 which are external to the turns connected to the supply wires 8 and 9. This connection gives a somewhat higher voltage for feeding the transformer 14 and will vary with the particular voltage relation of the main transformer and the cathode heating transformer.

The device to be evacuated is connected by suitable tubing 18 to a pump, which is constantly maintained in operation during the evacuation process. After the X-ray tube or other hot cathode device which is being evacuated has been given the usual preliminary exhaust during which operation the envelop is heated nearly to the softening point of glass the cathode is heated to incandescence and energy is impressed upon the cathode and anode, for example, by closing the switch 20, thereby sending an electron current from the cathode to the anode. The action of the current upon the anode causes some gas to be liberated which becomes ionized and causes the current carrying capacity of the tube to increase. The ionization of the gas produces positive ions which reduce the current-limiting effect of the negative electrons upon each other, or, in other words, reduce the space charge in the tube. This has the effect of decreasing the voltage drop between cathode and anode and permitting a greater current to flow. When the transformer furnishes a greater current to the tube a larger current must flow through the resistance 10 thereby producing an increased voltage drop across the terminals of this resistance and reducing the voltage impressed upon the primary winding of the transformer. The result of this is to decrease the voltage both at the terminals of the secondary of the transformer 7 and the voltage of the terminals of the transformer 14. The reduction in voltage at the terminals of the transformer 14 causes a reduced heating current to be delivered to the cathode tube, thereby lowering the temperature of the cathode and decreasing the electron emission. This decreased electron emission therefore opposes the tendency for a greater current to flow through the tube so that the equilibrium is established with a greatly decreased energy flow through the tube.

The operation of the pump having in the meanwhile continued the liberated gases are progressively removed until the voltage drop between cathode and anode is reestablished. The resulting increase of the potential of the heating current for the cathode increases the cathode temperature and hence the electron emission from the cathode. The voltage of the transformer 7 builds up until the voltage drop between cathode and anode again becomes high enough to cause the electron stream to be delivered with sufficiently high velocity to the anode to disengage an additional amount of gas, causing the above described process to be repeated. In this manner the evacuation of the tube with the removal of gas from the anode and other parts of the tube proceeds automatically without any danger of injury by excessive flow of current, until the X-ray tube operates continuously unaccompanied by the disengagement of gas and accompanying positive ionization. The tube may then be sealed off from the pump.

What I claim as new and desire to secure by Letters Patent of the United States, is:—

1. The method of preparing an X-ray tube containing a cathode the electron emission of which is variable independently of passage of current through said tube which consists in passing energy through said tube from a source of energy the voltage of which varies in a sense inversely with the amperage, varying the electron emission of said cathode inversely with the amperage of the current through said tube and coincidentally removing from said tube gas liberated by said passage of energy.

2. The method of preparing an electrical discharge apparatus containing a cathode operating at incandescence which consists in operating said device with current, the voltage of which varies in an inverse sense with the amperage, varying the temperature of the cathode of said device directly with the voltage of said current, and coincidentally continuing the removal of gas.

3. An apparatus for removing gas from an incandescent cathode discharge apparatus comprising a source of electric energy for operating said device, the voltage of which varies in an inverse sense with the amperage, means for heating the cathode of said device by current varying directly with the voltage of said source, and means for removing gases from said device.

4. An apparatus for automatically controlling the operation of an incandescent cathode vacuum device during evacuation comprising a high potential transformer adapted to supply operating current for said device, an ohmic resistance in the primary circuit of said transformer, a low potential transformer for heating the cathode of said device, means for supplying said second transformer with current from the primary circuit of said high potential transformer, and means for removing gases from said device disengaged by the conduction of energy therethrough.

5. An apparatus for preparing an incandescent cathode device for operation with a substantially pure electron discharge comprising means for supplying an operating current to said device the voltage of which varies substantially inversely with the amperage, means for automatically varying the temperature of the cathode of said device inversely with an increase of amperage of said operating current, and means for removing gases liberated during operation.

6. The method of controlling the energy input of an incandescent cathode device during exhaust which consists in reducing the operating voltage as the current carrying capacity of said device increases by the disengagement of gas and coincidently reducing the cathode temperature.

7. The step in the method of controlling the energy input of an incandescent cathode device during exhaust which consists in reducing the cathode temperature in step with an increase of current carrying capacity of said device due to gas evolution.

8. An electron discharge apparatus comprising the combination of a supply circuit, a voltage-consuming device in said circuit, a vacuum tube having a cathode rendered operative by heating, connections for deriving both an electron current and a cathode heating current for said tube from said circuit in series with said voltage-consuming device, said device being adapted to consume voltage varying in value directly with the current traversing the same.

9. An electron discharge apparatus comprising the combination of a supply circuit, an ohmic resistance device in said circuit, a vacuum tube having a cathode rendered operative by heating, connections for deriving both an electron current and a cathode heating current for said tube from said circuit in series with said voltage consuming device, said device being adapted to consume voltage varying in value directly with the current traversing the same.

10. An X-ray system comprising a supply circuit, a resistance device in said circuit, an X-ray tube having a cathode having an activating circuit, means for deriving a main operating current for said X-ray tube in series with said device from said supply circuit and means for deriving from said circuit also a cathode activating current which is modified in voltage by the consumption of voltage in said resistance device.

11. An X-ray system comprising the combination of a supply circuit, an incandescent cathode X-ray tube having main electrodes connected to derive current from said circuit, voltage regulating means in said supply circuit said means being constructed to produce a drop of voltage which increases directly with an increase of current transmitted by said tube, and means for heating the cathode of said tube by current transmitted by said means.

12. An X-ray apparatus comprising an incandescent cathode X-ray device, a transformer operatively connected to said device, a second transformer connected to the cathode of said device, a common supply circuit for both said transformers, and an ohmic resistance device in said supply circuit.

13. An X-ray system comprising the combination of a supply circuit, an incandescent cathode X-ray tube having main electrodes connected to derive current from said circuit, voltage regulating means in said supply circuit, said means being constructed to consume voltage varying directly with the variation of current transmitted by said tube, and means for heating the cathode of said tube by current transmitted by said means.

14. An X-ray apparatus comprising a supply circuit, an incandescent cathode X-ray device connected to derive current from said circuit, a resistance device in said circuit and means for heating the cathode of said device by current having a voltage proportional to the difference between the voltage of said supply circuit and the drop of voltage in said resistance device produced solely by the load current of said X-ray tube traversing said resistance.

In witness whereof I have hereunto set my hand this 9th day of September, 1922.

WILLIAM K. KEARSLEY, Jr.